(12) United States Patent
Rashidi

(10) Patent No.: US 9,660,980 B1
(45) Date of Patent: May 23, 2017

(54) METHODS AND SYSTEMS OF AUTHENTICATING A PASSWORD

(71) Applicant: Google Inc., Mountain View, CA (US)

(72) Inventor: Paul Rashidi, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 511 days.

(21) Appl. No.: 14/257,373

(22) Filed: Apr. 21, 2014

(51) Int. Cl.
*G06F 21/00* (2013.01)
*H04L 29/06* (2006.01)

(52) U.S. Cl.
CPC .................................. *H04L 63/083* (2013.01)

(58) Field of Classification Search
CPC ..................................................... H04L 63/083
See application file for complete search history.

(56) References Cited

U.S. PATENT DOCUMENTS

| | | | |
|---|---|---|---|
| 8,522,024 B2 | 8/2013 | Lu et al. | |
| 8,621,641 B2 | 12/2013 | Carow et al. | |
| 8,789,152 B2 * | 7/2014 | Gnech et al. | 726/6 |
| 2007/0028299 A1 * | 2/2007 | Albano | 726/5 |
| 2007/0250920 A1 * | 10/2007 | Lindsay | 726/7 |
| 2009/0199294 A1 * | 8/2009 | Schneider | 726/18 |
| 2013/0333010 A1 | 12/2013 | Chougle et al. | |
| 2015/0007292 A1 * | 1/2015 | Nambiar et al. | 726/7 |
| 2015/0172272 A1 * | 6/2015 | Levner | H04L 63/083 726/7 |
| 2016/0173485 A1 * | 6/2016 | Popoveniuc | G06F 21/316 726/1 |

* cited by examiner

*Primary Examiner* — Jeffrey Pwu
*Assistant Examiner* — William Corum, Jr.
(74) *Attorney, Agent, or Firm* — Fox Rothschild LLP

(57) ABSTRACT

A method of creating a password for a user account may include receiving, by a computing device, one or more authentication rules that each correspond to a password. Each authentication rule may describe a feature a password is to possess. The method may include receiving, by the computing device, a content and a corresponding action rule for the password, where the action rule specifies an action that is be performed if the password includes the received content, associating the authentication rules, the content, and the action rule with one or more credentials of the user for the user account, and storing the password type, the authentication rules, the content, and the action rule in a database.

9 Claims, 4 Drawing Sheets

METHODS AND SYSTEMS OF AUTHENTICATING A PASSWORD

BACKGROUND

Passwords continue to be potential security issues because users tend to disclose or re-use them across authentication systems. In addition, users often see a service provider logo on a website and provide their access credentials without regard for the website's uniform resource locator.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of creating a password for a user account may include receiving, by a computing device, one or more authentication rules that each correspond to a password. Each authentication rule may describe a feature a password is to possess. The method may include receiving, by the computing device, a content and a corresponding action rule for the password, where the action rule specifies an action that is be performed if the password includes the received content, associating the authentication rules, the content, and the action rule with one or more credentials of the user for the user account, and storing the password type, the authentication rules, the content, and the action rule in a database.

In an embodiment, a method of authenticating a password for an application may include prompting, by a computing device, a user for one or more credentials associated with a user account. The user account is associated with a password for the user account. The method may include receiving, by the computing device from a client computing device, a potential password, and determining, by the computing device, whether the received potential password satisfies each authentication rule associated with the password. The method may include, in response to determining that the received potential password satisfies the password type associated with the password and each authentication rule, determining whether the received potential password satisfies an action rule associated with the password, and in response to determining that the received potential password satisfies the action rule, performing an action associated with the action rule.

In an embodiment, a system of creating a password for a user account may include a computing device and a computer-readable storage medium in communication with the computing device. The computer-readable storage medium may include one or more programming instructions that, when executed, cause the computing device to receive one or more authentication rules that each correspond to a password, where each authentication rule describes a feature a password is to possess, receive a content and a corresponding action rule for the password, where the action rule specifies an action that is be performed if the password includes the received content, associate the authentication rules, the content, and the action rule with one or more credentials of the user for the user account, and store the authentication rules, the content, and the action rule in a database.

In an embodiment, a system of authenticating a password for a user account may include a computing device and a computer-readable storage medium in communication with the computing device. The computer-readable storage medium may include one or more programming instructions that, when executed, cause the computing device to prompt a user for one or more credentials associated with a user account, where the user account is associated with a password for the user account, receive a potential password, and determine whether the received potential password satisfies each authentication rule associated with the password. The computer-readable storage medium may include one or more programming instructions that, when executed, cause the computing device to, in response to determining that the received potential password satisfies the password type associated with the password and each authentication rule, determine whether the received potential password satisfies an action rule associated with the password, and in response to determining that the received potential password satisfies the action rule, performing an action associated with the action rule.

DETAILED DESCRIPTION

The following terms shall have, for purposes of this application, the respective meanings set forth below:

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like. When used in the claims, reference to "a computing device" may include a single device, or it may refer to any number of devices having one or more processors that communicate with each other and share data and/or instructions to perform the claimed steps.

A "password" refers to a sequence of one or more characters, images, sounds, symbols and/or the like that is used to access a user account. A password may be a single word, a sequence of words, a pass phrase, a sentence, an equation and/or the like.

A "user account" refers to an application or other protected resource that is accessible via one or more credentials such as, for example, a password.

Figure 1:
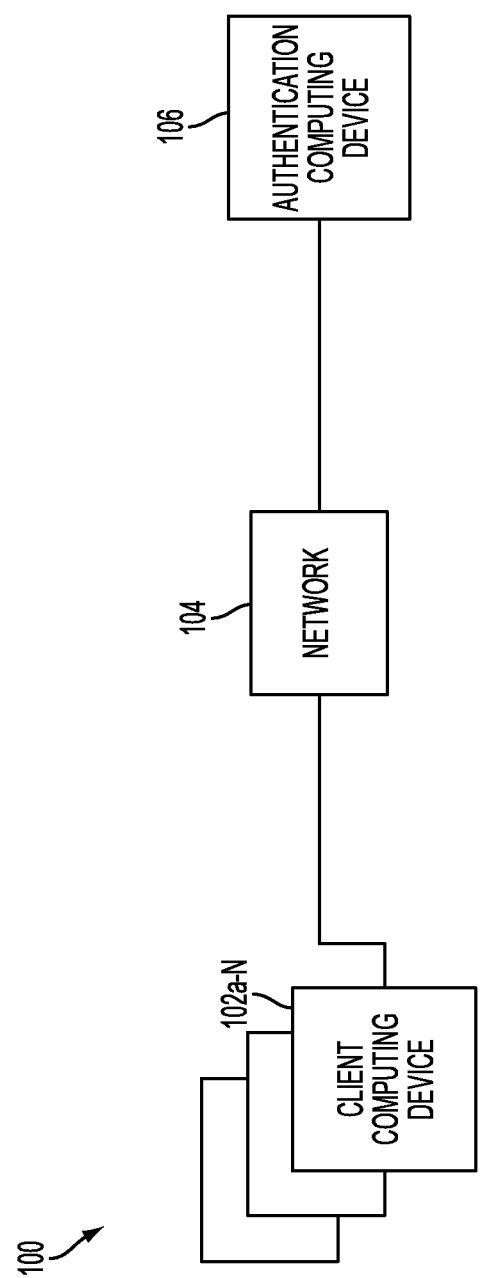
FIG. 1 illustrates an example system for authenticating a password according to an embodiment.

FIG. 1 illustrates an example system 100 for authenticating a password according to an embodiment. As illustrated by FIG. 1, the system 100 may include one or more client computing devices 102a-N, a network 104, and an authentication computing device 106. Although the system 100 is described in terms of authenticating a password for a web-based service or account, it is understood that the system may authenticate passwords for additional and/or alternate systems within the scope of this disclosure.

In an embodiment, a client computing device 102a-N may be a computing device that is associated with a system or application that accesses a user account or resource via a password or other credential. A client computing device 102a-N may communicate with an authentication computing device 106 via a network 104. A network 104 may be a local area network (LAN), a wide area network (WAN), a mobile or cellular communication network, an extranet, an intranet, the Internet and/or the like.

In an embodiment, an authentication computing device 106 may be a computing device that authenticates a password or other credential that is received from a client computing device 102a-N. Examples of authentication computing devices 106 may include servers, mainframes and/or the like.

In certain embodiments, a client computing device 102a-N may be a device associated with a user of a user account. For instance, a client computing device 102a-N may be a tablet, a mobile device, a laptop computer and/or the like. In alternate embodiments, a client computing device 102a-N may be a server, a mainframe and/or the like, and the system may be used for server-to-server authentication.

Figure 2:
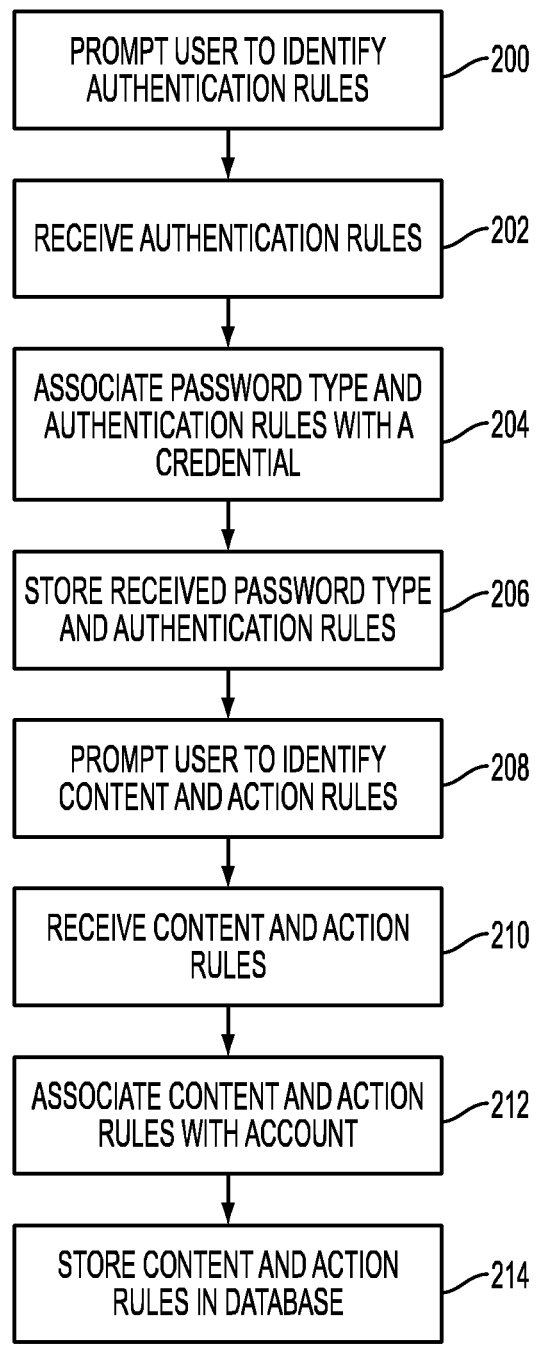
FIG. 2 illustrates a flow chart of an example method of initializing a password according to an embodiment.

FIG. 2 illustrates a flow chart of an example method of initializing a password according to an embodiment. As illustrated by FIG. 2, a system may prompt 200 a user to identify one or more authentication rules associated with a password. An authentication rule may define a format or type of content that is to be present in an authentication portion of a password. For example, an authentication rule may require that a password include the word "apple." In an embodiment, the system may prompt 200 a user to identify one or more authentication rules by causing one or more checkboxes, fields, drop-down menus, boxes, buttons and/or the like to be displayed on a client computing device through which a user can identify one or more authentication rules.

In an embodiment, the identified authentication rules may be specific to a particular password type. A password type may indicate a format or other characteristic of a password. Example password types may include, without limitation, a word, a phrase, a sentence, an equation and/or the like. For instance, if an authentication rule is identified that specifies a value to which the password evaluates, then the password type may be an equation. As another example, if an authentication rule specifies that the password includes the phrase "brown fox", the password may be identified as a phrase or a sentence.

In certain embodiments, the system may determine one or more password types to a password based, at least in part, on the associated authentication rules for the password. In alternate embodiments, a system may not determine a password type to a password.

Table 1 illustrates example authentication rules for example password types according to an embodiment. However, additional password types and/or authentication rules may be used within the scope of this disclosure.

TABLE 1

| Password Type | Authentication Rule |
|---|---|
| Sentence | Ends with 'd' |
| Sentence | Must use a contraction |
| Sentence | Must reference a friend's name from a social network |
| Sentence | Must pass basic parsing rules for English |
| Equation | Must include '46' |
| Equation | Includes equality/inequality |
| Equation | Includes subtraction on the left side |
| Equation | Includes multiplication on the right side |
| Equation | Left side evaluates to '42' |
| Any | Includes a digit from my user's birth year |

In an embodiment, a system may receive 202 one or more authentication rules from a client computing device. For instance, a system may receive 202 an indication that a user's password should include the number '10' and evaluates to '2'. As another example, a system may receive 202 an indication of an authentication rule that requires that a password end with the letter 'd'.

The system may associate 204 the received authentication rules with a credential for the corresponding user account, and may store 206 the received authentication rules in a database, list or other data structure such that they are associated with the corresponding user account. If the system determines a password type for the password, the system may associate the password type with a credential for the corresponding user account, and may store the password type in a database, list or other data structure such that they are associated with the corresponding user account.

As an example, a user may specify that the user's password should include the number '10' and evaluate to '2'. Example passwords that may satisfy these constraints include, without limitation, "10−8=2" or "10+5−13=2." As such, any password that satisfies the authentication rules associated with the corresponding user account may be used to access the user account. For example, an authentication rule may require that a password end with the letter 'd'. Accordingly, passwords that include "the frog jumped" and "the boy laughed" may each be valid passwords even though the password content differs.

In an embodiment, a password may include or be associated with one or more action rules. An action rule may specify one or more actions that are to be performed when a password includes certain content. For example, a user may log into an application by providing a password that includes the word "untrusted." The use of the word "untrusted" may trigger an action rule that indicates that no data should be provided to the application or that only dummy data should be provided to the application. A user may want this action performed if the user is accessing an application from a public device or a device that a user suspects is unsecure.

As another example, a user may log into an application by including the word "spoken" as part of the password. The use of this word may indicate that the user is accessing the application using voice commands, and that a subsequent use of the same password should be prohibited. For instance, using the above example, a user may present a password "10−5=5 spoken." The presence of the word "spoken" in the password may trigger an action rule that prohibits the subsequent use of the same password. If a user tries to access the corresponding user account using the password "10−5=5 spoken", the system may deny access. Referring back to FIG. 2, a system may prompt 208 a user to identify password content and one or more associated action rules for a password. The system may prompt 208 a user to identify a password content and/or one or more action rules by causing one or more checkboxes, fields, drop-down menus, boxes, buttons and/or the like to be displayed on a client computing device.

The system may receive 210 a password content and one or more associated action rules for a password. For instance, the system may receive this information from a client computing device. The system may associate 212 the received content and action rules with a credential of the user account, and may store 214 this information in a database, list or other data structure associated with the user account.

Table 2 illustrates example password content and associated action rules according to an embodiment. For example, referring to Table 2, a user may specify that if a password includes the word "untrusted", that the system is to invalidate the authentication after a certain time period. Additional and/or alternate content and/or action rules may be used within the scope of this disclosure.

TABLE 2

| Content | Action Rule |
| --- | --- |
| Untrusted | Invalidate the authentication after a certain time period |
| Untrusted | Provide no data to application |
| Untrusted | Provide dummy data to application |
| Untrusted | Provide an alternate email identity |
| Spoken | Subsequent use of password is prohibited |

Figure 3:
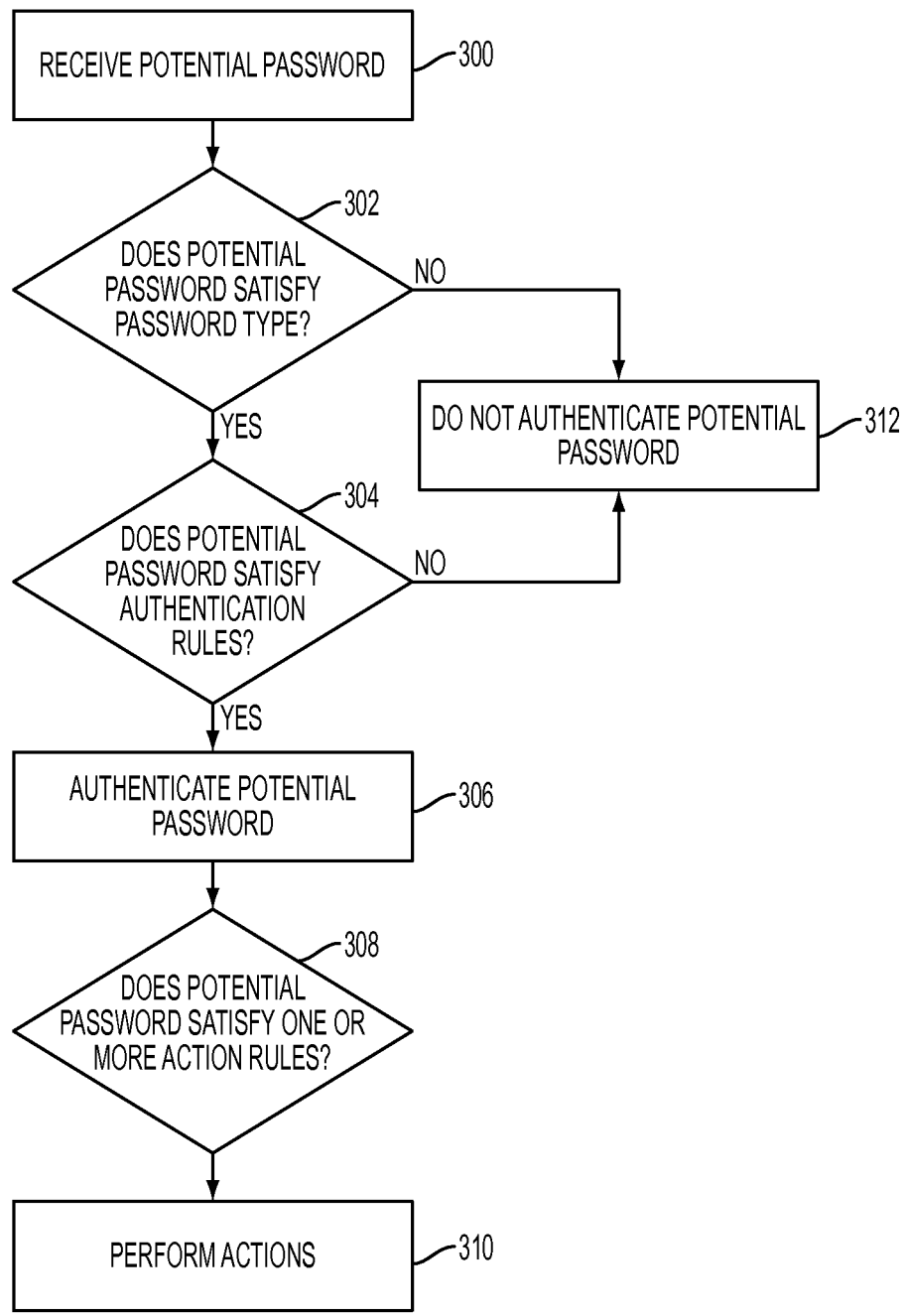
FIG. 3 illustrates a flow chart of an example method of authenticating a password according to an embodiment.

FIG. 3 illustrates a flow chart of an example method of authenticating a password according to an embodiment. As illustrated by FIG. 3, an authentication computing device may receive 300 a potential password for a user account from a client computing device. In an embodiment, the authentication computing device may determine 304 whether the potential password satisfies each authentication rule associated with the user account. For example, a user may specify as an authentication rule that the word "bluebird" be present in a password. The authentication computing device may determine 304 whether a received potential password includes the word "bluebird." If it does, the authentication computing device may determine 304 that the potential password satisfies the authentication rule. If it does not, the authentication computing device may determine 304 that the potential password does not satisfy the authentication rule.

In an embodiment, the authentication computing device may authenticate 306 the potential password if it satisfies the password type 302 and each authentication rule. The authentication computing device may not authenticate 312 the potential password if it does not satisfy the password type and/or does not satisfy each authentication rule.

In an embodiment, an authentication computing device may perform a second authorization. For instance, an authorization device may perform a second authorization when it determines that there is a likelihood that the potential password was provided as part of malicious activity. For example, if an authentication computing device determines a likelihood that a potential password was provided via keyboard logging, the authentication computing device may ask the user to provide a second password. Additional and/or alternate malicious activities may be used within the scope of this disclosure.

In certain embodiments, the authentication computing device may ask a user to provide a second password that is different from the first password that was provided. The authentication device may determine 304 whether the second potential password satisfies each authentication rule associated with the user account, and if so, authenticate 306 the second potential password.

As illustrated by FIG. 3, the authentication computing device may determine 308 whether the potential password satisfies one or more action rules associated with the user account. In response to the potential password satisfying an action rule, the authentication computing device may perform 310 the action specified by the action rule. For example, an action rule may specify that an authentication is to be revoked after one hour if the word "untrusted" is included in a password. If a potential password includes the word "untrusted", the authentication computing device may revoke the authentication after one hour. As such, two passwords that trigger different action rules may be authenticated despite having different content.

In certain embodiments, an authenticating system, such as that described above, may be used for server-to-server authentication. For instance, an application may use one or more user credentials to retrieve one or more refresh tokens in an OAuth2 framework. The authentication method describe above, for example, with respect to FIG. 3, may be used to authenticate user credentials provided by one or more servers or other computing devices rather than being provided directly from a user. If the credentials are authenticated, then a refresh token or other access may be granted.

Figure 4:
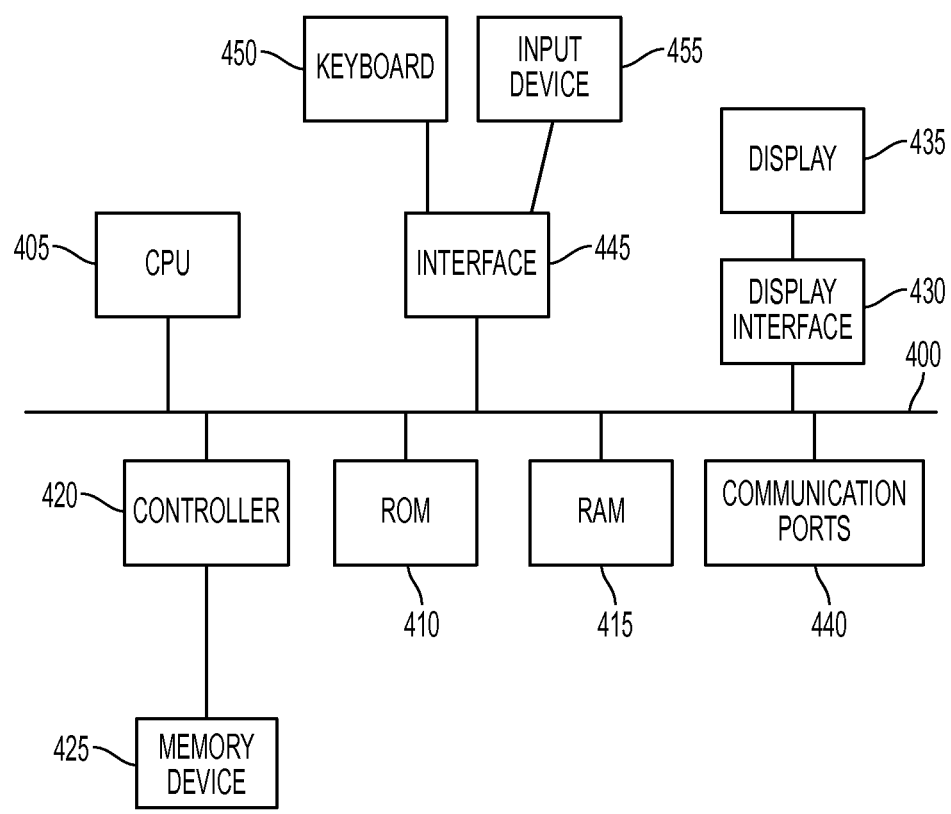
FIG. 4 illustrates a block diagram of example hardware that may be used to contain or implement program instructions according to an embodiment.

FIG. 4 depicts a block diagram of hardware that may be used to contain or implement program instructions. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible, non-transitory computer-readable medium such as a compact disk, a digital disk, flash memory, a memory card, a USB drive, an optical disc storage medium and/or other recording medium.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communication network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of authenticating a password for a user account, the method comprising:
    prompting, by a computing device, a user for one or more first credentials associated with the user account, wherein the user account is associated with a user password for the user account;
    receiving, by the computing device from the a client computing device, a first password;
    determining whether the first password was provided as part of a malicious activity; and
    in response to determining that the first password was provided as part of a malicious activity:
        prompting, by the computing device, the user for one or more second credentials associated with the user account that are different than the one or more first credentials,
        receiving, by the computing device from the client computing device, a second password that is different than the first password,
        determining, by the computing device, whether the second password satisfies each authentication rule associated with the user password, and
        in response to determining that the second password satisfies each authentication rule:
            determining whether the second password satisfies an action rule associated with the user password, and
            in response to determining that the second password satisfies the action rule, performing an action associated with the action rule.

2. The method of claim 1, further comprising:
    receiving, by the computing device during a subsequent access attempt, a third password to access the user account, wherein the third password is different from the first password and the second password;
    determining whether the third password satisfies each authentication rule; and
    in response to determining that the third password satisfies each authentication rule, allowing the client computing device to access the user account.

3. The method of claim 1, further comprising:
    receiving, by the computing device during a subsequent access attempt, a third password to access the user account, wherein the third password is different from the first password and the second password;
    determining whether the third password satisfies each authentication rule; and
    in response to determining that the third password does not satisfy each authentication rule, not allowing the client computing device to access the user account.

4. A system of authenticating a password for a user account, the system comprising:
    a computing device; and
    a computer-readable storage medium in communication with the computing device, wherein the computer-readable storage medium comprises one or more programming instructions that, when executed, cause the computing device to:
        prompt a user for one or more first credentials associated with the user account, wherein the user account is associated with a user password for the user account,
        receive a first password,
        determine whether the first password was provided as part of a malicious activity, and
        in response to determining that the first password was provided as part of a malicious activity:
            prompt the user for one or more second credentials associated with the user account that are different than the one or more first credentials,
            receive a second password that is different than the first password,
            determine whether the second password satisfies each authentication rule associated with the user password, and
            in response to determining that the second password satisfies each authentication rule:
                determine whether the second password satisfies an action rule associated with the user password, and
                in response to determining that the second password satisfies the action rule, perform an action associated with the action rule.

5. The system of claim 4, wherein the computer-readable storage medium further comprises one or more programming instructions that, when executed, cause the computing device to:
    receive during a subsequent access attempt a third password to access the user account, wherein the third password is different from the first password and the second password;
    determine whether the third password satisfies each authentication rule; and
    in response to determining that the third password satisfies each authentication rule, allow the client computing device to access the user account.

6. The system of claim 4, wherein the computer-readable storage medium further comprises one or more programming instructions that, when executed, cause the computing device to:
    receive during a subsequent access attempt a third password to access the user account, wherein the third password is different from the password and the third password;
    determine whether the third password satisfies each authentication rule; and
    in response to determining that the third password satisfies each authentication rule, allow the client computing device to access the user account.

7. The method of claim 1, wherein:
    the user password for the user account is an equation that evaluates to a certain value,
    determining whether the second password satisfies each authentication rule associated with the user password comprises determining whether the second password is an equation that evaluates to the certain value.

8. The method of claim 1, wherein:
    determining whether the second password satisfies an action rule associated with the user password comprises determining whether the second password includes an indication that the second password is being spoken, and performing an action associated with the action rule comprises denying access to the user account if a subsequent access attempt is made using the second password.

9. The method of claim 1, wherein:

determining whether the second password satisfies an action rule associated with the user password comprises determining whether the second password includes an indication that the user is not trusted, and performing an action associated with the action rule comprises revoking the user's access to the account after a time period.

\* \* \* \* \*